Dec. 12, 1944.  D. K. WARNER  2,364,677
COMPRESSION AIRPLANE
Filed Nov. 13, 1940  2 Sheets-Sheet 1

Inventor
Douglas K. Warner

Dec. 12, 1944.                D. K. WARNER                 2,364,677
                          COMPRESSION AIRPLANE
                        Filed Nov. 13, 1940            2 Sheets-Sheet 2

Inventor
Douglas K. Warner

Patented Dec. 12, 1944

2,364,677

UNITED STATES PATENT OFFICE 2,364,677

COMPRESSION AIRPLANE

Douglas K. Warner, Sarasota, Fla.

Application November 13, 1940, Serial No. 365,446

15 Claims. (Cl. 244—15)

This invention relates to airplanes of both the free-flying and the skimming-plane types, and has for its several objects, first, to provide an airplane of continuous-wing construction which shall be inherently stable both laterally and longitudinally, yet with a load-carrying capacity uniquely far in excess of that of ordinary planes of similar or much larger size, engine-power, speed, and cost of manufacture, maintenance and operation; second, to largely and mostly eliminate the parasite resistance, such as much of the usual body, the landing-gear, the protrusion of stabilizing fins, retractable gears and other factors constitute; third, to enable take-off to be made at an unusually high speed and under heavy load, whether the respective take-off runs are from land or water or carrier-deck, thus by this fact alone permitting the transportation of loads which would be impossible to carry with a normally low take-off speed; fourth, to produce a propulsive system which shall employ the engine-force in the most effective manner, so as to secure from it ample propulsive power and lift power, both by initial and secondary transformation of velocity energy into pressure, and by concomitant and sequent control and use of the air-stream and such pressure to achieve unusual speed even under the above-mentioned heavy load; fifth, to construct a plane-body which provably by known aero-dynamic principles exemplified in established diagrammatic determining charts, will cooperate with that propulsive system to continue its aforesaid effects.

A further especial object of my invention is to provide such an airplane which in the smaller or commonly-sized planes currently employed as bombers, will develop a top speed and bomb-capacity remarkably above that of any other type existing; and which also when constructed in the extremely large form of a sea-skimming aircraft-carrier will permit such a parent vessel to carry an exceptionally great number of these heavily loaded bombers, and itself as a sea-skimming carrier travel so loaded at extremely high velocity to contribute that special velocity to the bombers in launching them at a take-off speed which they could not otherwise attain.

My invention consists primarily in the combination of a specially-devised continuous-wing plane structure embodying the attributes above-indicated, and formed with a raised central fuselage section and depressed laterally-extending swept-back sections, and a forwardly-located air-chamber in the under surface of said body constituting a pressure-chamber operating directly upon and against said under surface of the said body to produce distinct, definite and hitherto-unattained lift, and operating directly upon and against the land-surface or water-surface or deck-surface in taking off, and directly upon and against the shallow air-thickness and water or land beneath it in skimming, and directly upon and against the air beneath the plane in free flying, to continue said lift effect during such flights; and a plurality of engines and fans mounted rearward of the leading edge of the plane at the central section thereof, so mounted and arranged in relation to their housing and to the pressure-chamber that they create a pressure-lift, and continuously produce a high propulsive power concomitantly, to attain the desired high speed under high load; together with such additional and related elements and factors of adaptation and coordination of the propulsive system and body structure as I shall hereafter fully describe, which are illustrated in the drawings, and specifically pointed out in the claims.

In the accompanying drawings forming part of this specification, in which like reference numerals represent similar parts in all the figures.

Figure 1:
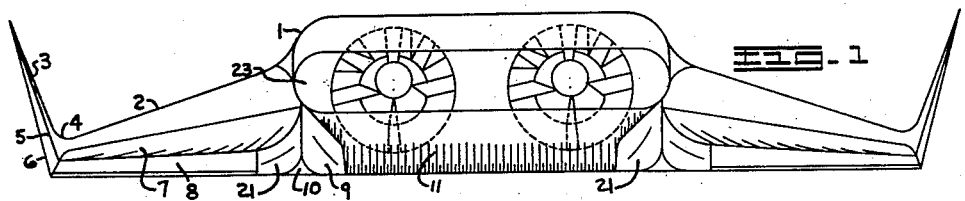
Figure 1 is a front elevation of a thick-wing or moderate speed compression plane embodying my invention.
Figure 2:
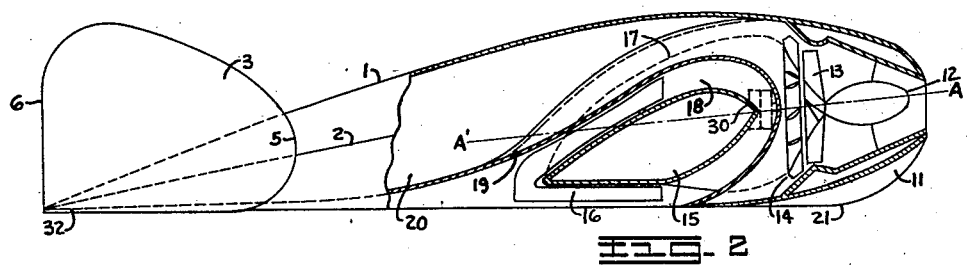
Figure 2 is a side elevation of the same, with the forward portion sectioned on the centre line B—B' of Figure 3, in vertical longitudinal section.
Figure 3:
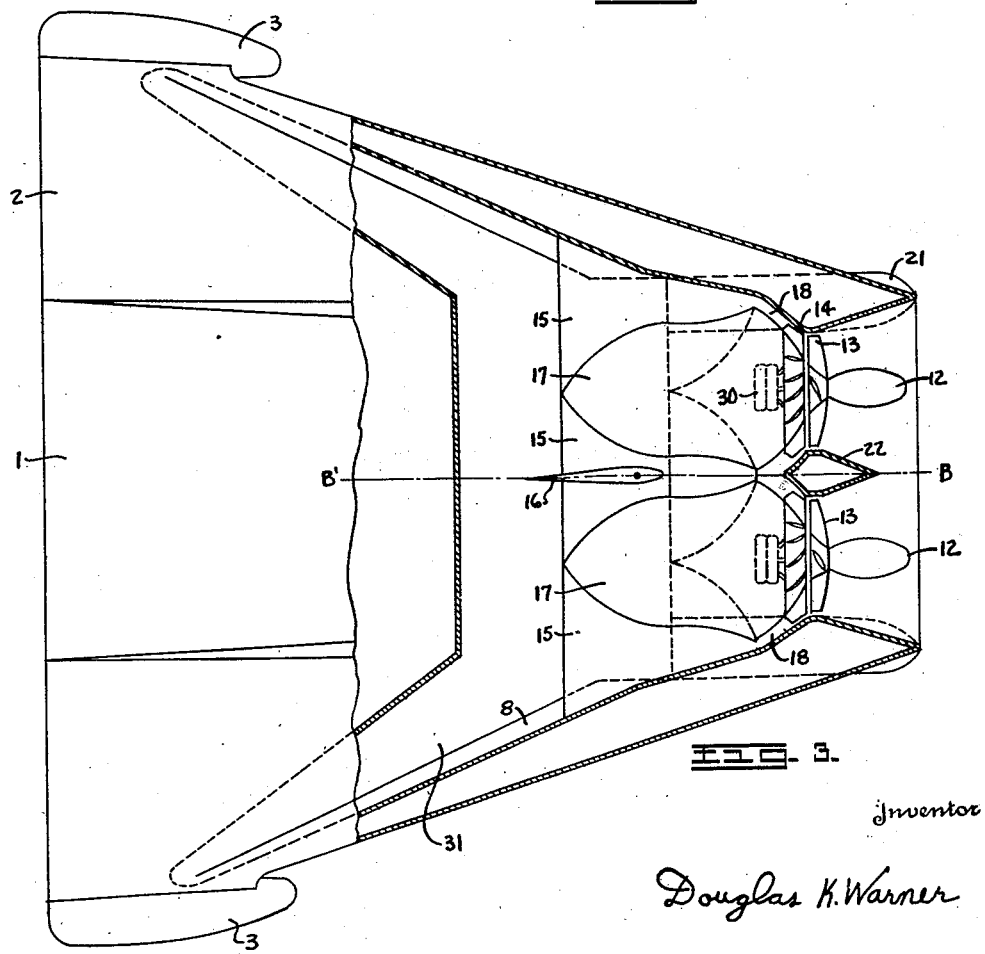
Figure 3 is a plan view of the device shown in Figures 1 and 2, with its forward portion cross-sectioned along the line A—A' of Figure 2.

In the construction of an airplane embodying the principles and features of my invention, and with immediate particular reference to the form shown in Figures 1, 2 and 3, I form the fuselage or body portion of the plane in a generally frusto-conical or frusto-triangular shape in plan view, with its leading edge a fraction in width of the trailing edge, as shown in Figure 3, wherein it is approximately one-half or less of said trailing edge, though no actual ratio is required or intended, nor is the slant of its sides necessarily at any given angle.

As seen in front elevation in Figure 1, the central forward section 1 of the plane is elevated above the level of the remainer of the body, and thus is notably the highest part of the plane, there being no vertical protrusions or appendages beyond the said height of the central section 1.

At either side of the central raised section 1 are laterally-extending sections 2, which may be considered as wing-sections, although the entire body is in fact one continuous wing both intentionally and operatively. The lateral sections 2 are materially depressed below the upper surface of the central section 1, at their inner forward points of connection therewith, and are further depressed, slanted diagonally outwardly therefrom, and at their leading edges are swept back both outwardly and downwardly from the front of the plane to the common trailing edge of all the sections 1 and 2, which as shown in Figure 3 is a straight line across the rear, of a length approximately the same as the chord of the plane, though here also no necessary ratio is implied.

Upon the outer ends of the lateral sections 2, from the trailing edge of the plane forwardly a fraction of its chord, are located fins 3, the profile shape whereof is shown in elevation in Figure 2. They are set at a dihedral angle as shown in Figure 1, with a fillet 4 at their junction with the lateral wing-sections 2, and taper upwardly in gradually decreasing thickness as shown in Figure 1, the leading edge 5 of these fins being rounded in side elevation as in Figure 2, the trailing edge 6 being vertically straight.

Attached to the leading edge 7 of the lateral wing-sections 2 are flexible steel flaps 8 depending from the under surface thereof. These flaps 8 contact the water or land-surface or carrier-deck on which the airplane may lie when starting the engines, and prevent the forward escape of air in the operation of the invention by sealing against such escape, as will more fully be taken up when describing the operation of the invention hereinafter.

The sides 9 and under surfaces 10 of the pontoons 21 are tapered to streamlined prows as indicated in Figure 1, and the surfaces 10 are continued rearwardly as indicated in Figure 1, to serve as runners and to hold the air from lateral escape, as well as to slide the plane's weight on land or support it by displacement in the water. These pontoons are located at either side of the central raised section 1, in line with the under surface of its lower lip 11. The pontoons form the cabins for the pilots and crew of the airplane.

The central fuselage section 1 of the continuous-wing structure outlined, is provided with a wide medially-located transverse slot 23, leaving the upper or leading edge of the section 1, and the lower lip 11 thereof, spaciously separated to form an inlet opening, a diffusing passage rearward of the opening, and further rearward thereof a housing for a plurality of engines which are mounted therein, as shown in Figures 1 and 2, which illustrate the upper and lower walls of this housing as being double, hollow, and extending over and under said engines transversely throughout the span of the central section 1. The inlet diffusing passage compresses the entering air by ram effect, and the motor-driven fans compress it further, as well as accelerate it for additional diffusion and compression beyond the fans.

In Figures 1 and 2 are shown two engines 12 in the fuselage-nose within the chamber formed back of the slot 23. I contemplate the use of a considerable number of engines, far more than currently conventional, as will be seen in part when describing the form of plane shown in Figures 4, 5 and 6. In connection with these engines 12, of which only the casings are depicted in the drawings, and at the rear thereof, are mounted fans 13, which turn counter-clockwise and discharge air rearwardly and outwardly along a rapidly expanding hub to fans 14, mounted in juxtaposition to, and behind, the fans 13. These fans 14 are driven clockwise in oppositely directed couple with the fans 13, and are powered by engines 30, indicated in Figures 2 and 3. These fans 14 have more numerous blades than the front fans 13, which blades are of a design to compress the air. They likewise are mounted on a rapidly-expanding hub, keeping the air-flow lines in line with those started by the expanding hub of the fan 13. The engines 30 of the fans 14 are covered by housings 17. Forwardly of the housings 17, and lying midway thereof in the fuselage-nose, is a spear-shaped baffle-member 22.

The under surface of the airplane body is formed with a deep indenture in the front portion of its frame to constitute an exterior air-chamber which commencing at the rear, rises gradually in the rear portion thereof, and then ascends rapidly from a point about or in front of, the longitudinal centre of the airplane body, forwardly to a high peak above the motors 30.

Within this air-chamber formed by the deep indenture in and fashioning of the under surface of the plane-body, with the resultant upraised forward portion thereof as described, is fixed an air-foil 15, ranging transversely across and beneath said plane-body, the flat base of this air-foil lying slightly above the level of the surface 10 of the pontoons 21. A rudder 16 is pivotally mounted and centred between the housings 17, and operates in the full air-stream within the air-chamber.

By this construction and arrangement there are formed air-passages 18 discharging compressed air from the fan-couples 13 and 14, at each side of the air-chamber and above and below the air-foil 15. It will be noted that this air-chamber or deep indenture makes the airplane body practically open at bottom, from a point shortly back of the fans 14 to the trailing edge. And the body rearwardly above this chamber is closed off against ingress of compressed air from the fans and the passages 18; the inside of the body being formed into an interior compartment 20, employable as a storage chamber, as a bomb-storage in time of war, or freight at any time, or with suitable modifications, as a space or cabin for passengers, or in large planes, a series of such and in aircraft-carriers, a plane-hangar.

The passages 18 lead or emerge into ducts or widened passages 31, which constitute in effect extension of the air-chamber beneath the forward portion of the central raised section 1, into a flared vent portion, as best shown in Figure 3. These passages 18 and ducts or flared terminal of the air-chamber, are all open underneath in contact with the water or land-surface or deck-surface in take-off, and in communication with the air-thickness above said surfaces in skimming, or with the air between the under surface of the plane and the more or less distant solid or liquid earth-surface over which the plane may be flying high and free. All these elements of the invention, the air-chamber, the passages 18 and the ducts or flared terminals 31, are so characterized. A distinct compression chamber is formed directly beneath the plane-body, with that pressure directed against the under surface of the body 20, and against the under surface of the air-foil 15.

Figure 4:
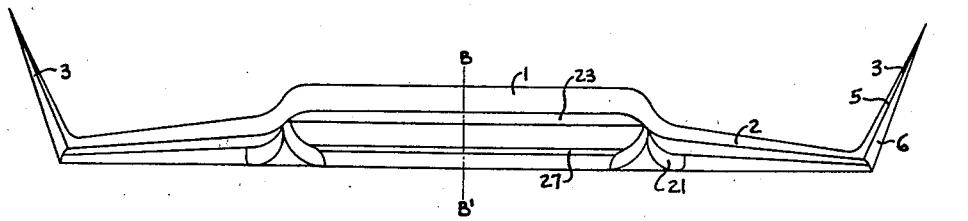
Figure 4 is a front elevation of the thin-wing compression plane housing and developing an immense amount of power for the purpose of carrying extremely heavy loads at very high speeds high in the air.
Figure 5:
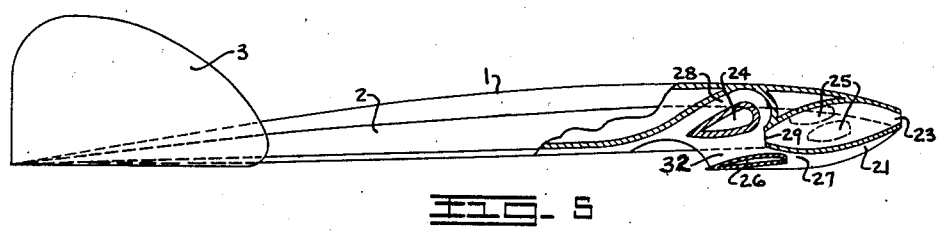
Figure 5 is a side elevation of the same ship shown in Figure 4, the forward portion thereof being in central vertical longitudinal section on the line B—B' of Figure 6.
Figure 6:
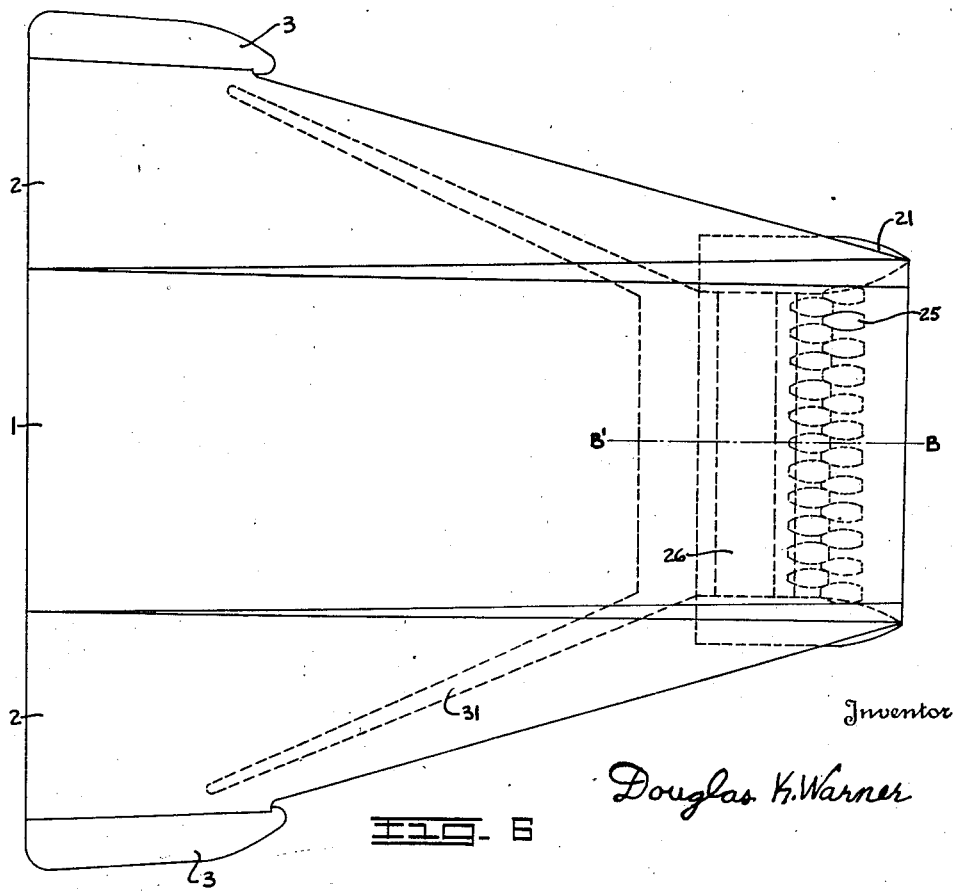
Figure 6 is a plan view of the same, showing in dotted lines the top row of the tiny compressor-jet engines and the bottom indentures or air-pressure chamber in the under surface of the forward portion of the central section of the plane.

Before proceeding with the mode of operation of my airplane, I shall describe the form shown in Figures 4, 5 and 6. These figures illustrate a thin-wing type, one in which I employ not only high power of engines but also a special and improved system and structure for controlling, transforming and directing the compressed air-stream. The chief difference between the two types of planes shown respectively in Figures 1, 2 and 3, and in Figures 4, 5 and 6, lies in the wing thickness or depth, the methods and degree of compression, and the methods of expanding and directing the air under the forward portion of the plane for gaining increased lift and propulsive power for higher speeds and heavier loads.

In this improved and modified form, a generous number of small but powerful engines 25 are mounted in the fuselage-nose as indicated in dotted lines in Figures 5 and 6, and the said nose and the diffusion and engine chamber formed back of the slot 23 by the upper surface of the plane-body and the under lip of the same, are not only flatter but narrowed down into a thin straight horizontal jet nozzle 29 discharging into a passage 32 formed between an air-foil 26 located beneath and rearward of the nozzle 29, and a fixed hollow transversely-ranging structural member 24 above said nozzle and said air-foil 26. There are thus formed, beside the air-passage 32, a curved and rounded air-passage 28 commencing above the nozzle 29, in connection with the passage 32, and extending around the structural member 24 immediately under the lower surface of the air-plane body or forward portion thereof, and another air-passage 27 between the under surface of the nose of the plane and the air-foil 26, all as shown in Figure 5.

As is customary in matters of such inventions in this and similar fields, I have not shown and described in detail the construction of the engines, nor the various operating and steering mechanisms, or other appurtenances which form no actual part of my invention, it being understood that all such apparatus and expedients may be of current or any approved pattern.

On the other hand, I have rather exactly described the structure of my airplane, for clearness both of comprehension and of knowledge to all how to construct it. But I may vary some of these details in practice, and it will be seen from the further description of the principles and operation of my invention, that many changes are possible in details without departing from its essential elements.

In operation of my invention, air enters the fuselage nose or front engine-chamber through the slot 23, is compressed by the fans 13 and 14 and driven out under great pressure into the passages 18 of the exterior air-chamber formed by the deep indenture in the under surface of the upraised forward portion of the central section 1. In the continued action of the engine, a glance at the shape of the interior of the fuselage nose within the slot 23, will show that there is a compression effect produced by a diffusion effect initially in this nozzle in front of the engines, in prelude to the considerable later diffusion. Diffusion also, results from the widening of the engine chamber rearwardly above and below the engines 12, with a further increase of pressure of air-intake.

Thereafter, the air is taken up by the reversely-rotating fans 13 and 14 and thereby compressed, being driven back and outwardly by fan 13 along its expanding hub to fan 14 with its blades designed especially for air-compression, as herein stated. This air is discharged under heavy pressure into the air-chamber beneath the upraised under surface of the plane-body, and through the passages 18 and ducts 31 which further diffuse and compress it.

There is then a considerable diffusion and conversion of velocity energy of said air, and transformation of that energy into pressure exerted directly upon the under surface of the plane and upon the under surface of the air-foil 15. This pressure and lift are so substantial and powerful that the resultant effects upon (a) the take-off of the plane, (b) the lift of load at starting, (c) the ability to start at all with an abnormally excessive load for planes of comparative size and engine power to this, (d) the transport of such loads through a complete journey, and (e) the attainment of high speed under such a load, are remarkable and striking and important in benefits and advantages.

In marked contradistinction to other planes designed with air-chambers intended to produce better propulsion and load capacity, I do not discharge the air from the engines and fans into the hollowed interior 20 of the whole body of the airplane, which contrarily in my invention is a storage chamber or compartment isolated from the compressed air-stream discharged by said fans exteriorly and below the upraised body-bottom.

The effect of discharging compressed air into the interior of such plane-bodies as I refer to would be (and if any such have been constructed and tested undoubtedly has been), to expand that air equally both against the interior upper wall or roof of the body and simultaneously against and upon its lower wall or floor, so that any lift which might otherwise exist beneath the roof is neutralized and counter-balanced by pressure down upon its floor. Besides which, similar pressure is likewise so exerted against all the sides of the interior of the plane.

In fact, in all such previous attempts at compressed air discharge from engines directly into a hollow plane-body, the actual discharge usually has taken place at a vent in the tail of the plane, with a rocket or recoil or reaction effect as to propulsion, with nothing in the way of load-carrying lift whatever, or at least nothing substantial and commensurate with the power expended. Not only have most of the paper plans of that nature never been constructed and made to fly, but I am not aware of any currently operating plane of the sort.

With my invention, the entire compressed-air power of the engines and fans is initially and directly applied as lift pressure. This pressure is upward against the under upraised surface of the plane-body and downwardly upon and against said surface beneath the plane, or the air beneath; and said pressure is also upwardly against the under surface of the air-foil 15, and again at the same instant down against the surface or air beneath the plane.

That full and entire engine-power is exerted directly upon the two opposed surfaces, that of the plane which is to rise, and that from which it is to be held up (as distinguished from an utterly alien conception of a divided pressure one-half of which is pushing up against the roof while the other half is counter-acting to push the plane down by pressing on its floor).

Hence, first, at take-off, before the plane is propelled forward, it rises slightly from the take-off surface. The take-off is more vertical than horizontal, but an extremely long take-off run close to surface is distinctly desirable; my method of starting a plane comprises initially lifting it from a surface with compressed air, skimming it preferably to a long stretch of water, and then skimming it until reaching a very high rate of speed, thereafter flying it at whatever altitude is desired. The first principle of my invention is applying approximately the totality of power of the plane, to lift pressure directed as just explained. Since the ability to start at all under heavy load necessitates such an application of engine power and pressure lift, it is only by this invention that such effect can be produced, for if alternatively one attempts it by using a larger size of plane and increased size of engine, this is completely to negative the desired object of obtaining from a given size of plane and engine the carrying of extraordinary loads, particularly under the condition precedent of taking off so loaded. This also is the case as to transport of such heavy loads, and doing this at exceptionally high speeds.

Referring further to the mode of operation of the invention, the passages 18 between the engine housing 17 and the interior passage walls of the under-open air-chamber formed by deep indenture in the upraised central portion 1, provide the diffusion means for transformation or converting of the velocity energy into pressure energy, and in continuing around the housings 17 above and below the same, the air is spread first and forced and directed under said upraised portion and under the air-foil 15, and thence is carried in ducts 31 or terminal channel in the swept-back lateral wing sections 2 as far out as the tips thereof. And these ducts and passages all being under-open, the bottom of these passages and ducts is comprised by the surface over which the ship is flying or skimming.

At speeds over 500 M. P. H., even thin air constitutes a practically immobile surface whose inertia is augmented by such speed as will render the said air relatively immobile to sudden displacement. Thus a pressure created under the nose of the plane holds substantially thereunder in even thin air, during the passage of the wings thereover where, as in my invention, the speed of wing is high enough to pass before the pressure wave has had time to move the air-column below.

This pressure wave must be, and in my invention is, directed and discharged as near as possible to the leading edge of the plane, and forward of the centre of gravity thereof, not alone because the lift at or forward of the centre of gravity will have the greatest effect in applying the totality of the pressure there at the right point, but also because then the maximum area of the ship's surface may receive the benefit of this pressure lift.

The ordinary plane capable of speeds in excess of 400 M. P. H. has practically no pressure lift. Designed for take-off at say 100 M. P. H., it will at say 180 M. P. H. fly at an incidence angle approaching that of maximum L/D. At top speed of such a plane of old type, the incidence angle is so low that any and all lift is top suction lift and most of the drag is skin friction drag; for a wing surface is being used in such a plane many times too great for the lesser load carried, a wholly disadvantageously excessive surface whenever the plane is traveling more than double the speed of take-off; and likewise the rudders, fins and ailerons if large enough for maneuvering at 100 M. P. H., are 16 times larger than needed at top speed, even in instances where these appendages are compelled to fight the wing reactions.

In my airplane, at low speeds the control surfaces are located in an air-stream of high velocity, the same as they are at top speeds. As a result, it is only necessary for me to use a rudder $\tfrac{1}{16}$ as large and of still lesser proportional weight. Since the wings are only $\tfrac{1}{16}$ the usual area the controls do not fight them against high leverages but instead cooperate with the wing bank in making a turn, by directing the air-pressure to the banking wing while forcing the nose around. The air-foil 15 below and to the side of the central rudder cooperates with it in the same manner in making a turn.

The central upraised section 1 has an incidence angle when at rest on a hard surface, slightly more than that corresponding to the incidence angle of maximum L/D and the lateral sections 2 are set at an incidence angle slightly below that of maximum L/D. Due to their area being located back of the centre of gravity, the centre of pressure upon the swept-back lateral sections 2 is rearward of the centre of gravity, while the centre of pressure upon the central section always remains at or forward of the centre of gravity. Therefore when the incidence angle of the plane increases, a proportionately much greater increase in lift occurs in the lateral sections 2 than the percentage increase of lift in the central section 1, resulting in a rearward motion of the average centre of pressure and in lifting the tail of the ship at that time faster than the nose. Again, if the nose dives a few degrees, the lift becomes zero or negative in the lateral wing section which had originally been set at from zero to two degrees incidence, and this results in loss of all lift behind the centre of gravity, and quick righting of the nose to level flight position.

It therefore becomes apparent that as the leading edge of the central section 1 is raised sufficiently to house all the driving fans between it and the under surface which is substantially in horizontal line with the common tail tip, the plane will also be inherently stable even when using the most efficient air-foils; that is, without the necessity of employing over-size and inefficient air-foils. The upper surface of the upraised central section 1 lies a considerable distance above the lateral sections 2, but this central portion may be thicker so that most of the lower surface which lies rearward of the air-distributing channels will have a straight line surface across the wing. Obviously the lateral wing sections having very slight incidence angle, have a bottom surface nearly parallel with the surface beneath, on which or over which the plane rests. Since a portion of the under surface is interrupted by the air distributing channels, the under portion of the nose is provided with the metallic flaps 8 which contact the surface and prevent the forward escape of air compressed beneath the plane and still be able to move over rough surfaces without breaking the air-seal or setting up material resistance by disturbing high spots in said surface.

Those skilled in the art know that in usual take-off there is but a limited run possible, and that since amphibious planes as well as sea-planes and flying boats heretofore have contacted the water before take-off, they thus are likely to be wrecked by a wave when take-off speed exceeds 80 M. P. H. But it is also known that a plane weighing say 10,000 lbs. which could take off at 100 M. P. H., with a load of 2000 lbs. of bombs, could take off with 38,000 lbs. of bombs at 200 M. P. H., or 98,000 lbs. at 300 M. P. H., provided the load could be put in that same plane without changing its contours. There of course is no plane existing by which this result is obtainable today, but by my invention this said result is achievable according to the simple and ordinary laws of aerodynamics by skimming the land and a water runway long enough to permit these said take-off speeds.

My compression plane does not touch the water after the engines are once gunned and it constantly rises higher from the surface with increase in speed. Thus if the plane is given a preliminary run down a smooth concrete runway, it is high enough to prevent contact with small waves, and by the time it has spanned the protected waterway it is high enough to avoid contact with higher waves. Since the weight of a compression plane is not limited as is that of a flying boat, its construction may be far more rugged, the points of wave-contact are of much smaller area, and enormous strength can be built into those or any spots desired. Unlike the flying boat, the balance of the compression plane is subject only to air pressure; and being always above the water, its only chance of contact would be some crest of a very high wave, which even then would only be striking some heavy rigid beam-type runner in my plane, and not a thin veneer or aluminum sheet as in other flying boats.

Among the many effects reached by my invention, as compared with previous and present planes, is that my plane does not require to be oversurfaced for take-off and thus stand at an important handicap when traveling at a top speed where that oversurface has become a drawback. If a plane of old type is oversurfaced so as to permit take-off from hull or wheels at a speed of 60 M. P. H., it requires almost as much power to drive that same plane at high speeds, with a pay load of 2000 lbs., as it would require to drive it at high speeds with 38,000 lbs. pay load which it could take off with at 120 M. P. H. For if such a plane takes off with a lift coefficient of say 1.4 (as near the stall point as prudent for the pilot to go), when the speed is doubled the lift coefficient is only one quarter of that, or .35 and the resulting attack angle results in a drag coefficient only a tenth as large, but further increase of speed enormously increases the drag without change in lift. Parasite drag also increases with the square of the speed, equally as the lift increases as the square of the speed, but where parasite resistance is absent at low speed, its square is also zero in this plane, while increased greatly in others.

While the plane is skimming, in my invention, there is an extraordinary righting moment. If the plane rises at any corner, air sweeps out from beneath at that point, creating an extremely high air velocity there, naturally accompanied by a very low temporary pressure. This sudden change from a very high positive pressure to a very low negative pressure or suction, instantly levels the plane after a bounce from a wave or other cause.

The wing tip fins 3 present a surface for stability in yaw, and horizontal stability; the latter is gained by having them slope outwardly upward from the fillets 4, and the former by locating this approximately vertical appendage rearward of the centre of gravity. The leading edges 5 of these fins toe in toward the centre line so that the distance between the leading edges 5 and the trailing edges 6 differs, being further apart at the tail, thereby creating a higher pressure drop above the tail while the fins at the same time prevent air from rushing in over the wing tips to fill this void.

As before stated, it is not essential to have the lateral sections 2 directed at any particular angle from point of departure or junction with the forward portion or leading edge of the plane, to the rear portion of the plane, nor is the angle of rearward direction of the ducts 31 under the rear portion of the plane body material, and I do not ascribe any material value or purpose to any special degree of angle here. Likewise there may be slight variation in the exact profile shape of the wing tip fins 3, and other features of my device, so long as the function of each such feature is maintained.

Besides pitch stability, and horizontal stability, and stability in yaw in high flight, and the righting moment described, hereinabove, in skimming, the change from skimming balance to flying balance is taken care of in the manufacture of the airplane for its different purposes of small plane for high speed flying with heavy load, or airplane carrier type with far heavier load of aircraft and as high speed as required, or other types, it being only a matter of the point of departure or junction of the lateral sections with the forward portion of the central section, and of the point of junction of said lateral sections with said central section at rear, to avoid any shift of the centre of pressure when changing from skimming to high flight, or a matter of shifting ballast during take-off.

While in Figures 1 and 2 I have shown four engines, I contemplate the use of many engines, as before stated, and am not restricted to the use of any limited number. The use of many engines in an airplane is doubtless indicated in the future of the art, and my invention is adapted thereto.

When the form of the invention illustrated in Figures 4, 5 and 6 is used, the generation of power is exceptionally great, the speeds attained approach the speed of sound, the immensely powerful compressor jet engines, small singly, deliver unusual pressure lift to the upraised under surface of the section 1. The driving fans compress air already measurably compressed by ram effect. At 770 M. P. H. ram effect fully utilized amounts to two atmospheres and at 550 M. P. H. to 1½ atmospheres. The large capacity fans are capable of two ratios of compression which if augmented by the ram effect at 550 M. P. H. gives three ratios of compression, or 45# absolute pressure or 30# gage pressure at sea level. The exhaust gases of the motors, after entraining ram compressed cooling air, are added to the fan compressed air at this energy level, and the whole mass of heated air is then allowed to leave the rear of the compressor jet housings, entraining more ram compressed air, the whole being ejected through orifice 29.

Air speeded over the top leading edge of airfoil 26 is entrained by the bottom of the jet leaving orifice 29 and recirculated air from passage 28 is entrained by the top surface of the jet. Both these air masses are given velocities nearly that of sound before being entrained in jet 29. In passage 32 the whole mass of the air is slowed down with increase of pressure which forms the pressure wave under the surface of the plane. This wave is composed of masses of air which in cumulative successive steps have been added to the air compressed by the fans, each with comparatively high entrainment efficiency due to small difference in air velocity at each entrainment step. As the great mass of air leaves at the passage 32, its velocity relative to the plane is still higher than the plane speed, but its pressure is also as high as half an atmosphere, and this pressure wave is moving rearwards with the approximate velocity of sound while it is at the same time discharging downwards with about the same velocity. The extent of pressure remaining under the tail tip depends on the thickness of the pressure wave of gases leaving orifice 32, and the weight of the disturbed air below the plane. The high pressure at 32 causes some of the air to recirculate above the stream-lined structural reinforcing member 24 through the passage 28 where it is reversed and again speeded up by jet 29. Both sides of the flat jet 29 thus impinge on slower-moving air, and its velocity, which exceeds that of sound, is accordingly not subject to the disastrous losses which would be realized if it were permitted to impinge directly on the diffusing wall surfaces of the orifice 32. The exit of recirculating passage 28 is restricted above the jet 29 to give a high rearward velocity before encountering the top of the jet.

I have hereinbefore mentioned that the small rudder 16, Fig. 2, located in very high-velocity air-stream suffies to maneuver at low speeds, and if in tow the lower part of this rudder will be in the water and serve as well as in high-speed air. However, in the form of ship equipped with the powerful tiny compressor jet engines, the response to throttle control is so instantaneous that the plane will require nothing besides throttle control for all manual maneuvering and stabilizing requirements. Speeding the right bank of engines will bank the right wing and bear the plane to the left, and vice versa. Positive manual motion downward of the trailing edge of air-foil 26 will increase the lift of the central section as well as advancing its centre of pressure, thus making the plane or vessel climb. Elimination of the rudder in planes or ships traveling at approximately sound speed is desirable from both the standpoint of weight and of air resistance and number of parts, but particularly in preventing flutter and possible loss of such appendages at such speeds. If while resting on the water, one bank of motors is suddenly started, that side of the vessel will rise away from the water, leaving the opposite tail fin submerged, and the plane will spin around that fin, thus making a complete turn without movement of that fin from its original location.

While my invention is applicable to all sizes and purposes of planes, amphibians, and skimming vessels, it is especially noteworthy in two forms and sizes, one of a monster airplane carrier or skimmer, able by this invention to carry an enormous quantity of such planes, and the other of a small plane likewise so able to carry an enormous quantity of bombs on each of the same; the invention enabling even such a large vessel as an air-craft carrier to travel at a high speed of hundreds of miles per hour, and launch the smaller airplanes under their own power with the addition of the carrier-speed at take-off in an augmented total speed never hitherto achieved or attempted to be thus designed.

In the manufacture and development of the airplane art and industry along the novel lines contemplated by my invention, there will arise improvements requiring some changes in details here and there from time to time, yet fully within the basic principles of my said invention; the exact nature of which variations is of course unpredictable; but obviously any such changes may be made without departing from the spirit and purview of my invention, as above described, and within the scope of my claims hereinbelow appended.

What I claim as new and of my invention, and desire to secure by Letters Patent is:

1. An airplane comprising a raised central section formed with a deeply indented upraised exterior air-pressure chamber in its under surface, substantially exposed to the water, land and air surfaces beneath and terminating at or near the trailing edge of the plane completely underneath the bottom surface thereof, with no intervening floor or bottom at this rear portion of the said pressure chamber or upraised surface, and no obstruction between said upraised rear portion and the water, land or air thereunder, whereby air pressure from said pressure chamber is directly upon and against said elements thereunder, a compressor power system located in communication with said exterior pressure chamber, and means for discharging a stream of compressed air therefrom into said pressure-chamber.

2. An airplane comprising a continuous wing composed of a raised central section and lateral swept-back wing sections depressed beneath the level of the upper leading edge of said central section, the centre of pressure of the lateral sections being located rearwardly of that of the central section, and rearwardly of the centre of gravity of the plane, while the centre of pressure of the central section is at or forward of said centre of gravity, the angle of incidence of the lateral sections being less than the angle of incidence of the central section, the said central section having its under surface upraised near its nose above the level of the lateral sections, and means for directing compressed air against the upraised under surface of the central section, and rearwardly under the body of the plane, in contact with the water, land and air surfaces beneath.

3. An airplane provided with a central section formed rearwardly of the plane nose into a hollow-interiored body closed to its trailing edge against ingress of compressed air from its power system, the under surface of the plane being upraised to form an exterior pressure chamber, engines mounted in said nose in communication with said pressure chamber, and lying under the upper leading edge of the plane, and means for directing a stream of compressed air against and under said upraised under surface into the pressure chamber, and subsequently against the under surface of the several sections of the plane to its trailing edge.

4. An airplane provided with a central section formed rearwardly of its nose into a hollow-interiored body closed to its trailing edge against the ingress of compressed air from its power system, the under surface of its forward portion being upraised to form an exterior pressure chamber, the centre of pressure of the central portion of the plane lying at or forward of the centre of gravity thereof in starting, in skimming, and in full flight in high air, and the centre of pressure of the lateral portions of the plane lying at all times rearward of said centre of gravity, and a compressor system communicating with said pressure chamber, to direct substantially the totality of the power initially to the under surface of the upraised portion of the plane within said pressure chamber.

5. An airplane provided with a hollow-interiored body closed from its power and pressure system, and upraised under its forward surface to form an exterior pressure chamber and terminating at or near the trailing edge of the plane completely underneath the bottom surface thereof, with no intervening floor or bottom at this rear portion of the said pressure chamber or upraised surface, and no obstruction between said upraised rear portion and the water, land or air thereunder, whereby air pressure from said pressure chamber is directly upon and against said elements thereunder, and compressor engines mounted within the nose of the plane and communicating with said pressure chamber said nose being narrow and horizontally slotted at the front, increasing in depth and height a short distance to the rear, and the engines being provided with fans mounted at the deep rear of said nose, discharging into the pressure chamber, and said pressure chamber being also widened rearwardly, whereby there is a double diffusion of air in and through said nose, and in and through the pressure chamber.

6. An airplane comprising a continuous wing having a central section with plural engines below its upper leading edge, and fixed lateral swept-back sections whose centre of pressure is located forwardly of the centre of pressure of the central section, and whose angle of incidence is less than that of the central section, and whose lower surface is lower than the lower surface of the central section except at and near the trailing edge of the several sections, and an exterior pressure chamber formed in the forward portion of the central section in the under surface thereof.

7. An airplane comprising a continuous wing having a central section with plural engines beneath its upper leading edge, and having in its forward portion an upraised under surface to form an exterior pressure chamber, fixed swept-back stabilizing sections whose centre of pressure is located back of that of the central section, and ducts open to the water, land and air surface beneath the plane, and leading to the under surface of the several sections rearwardly of the exterior pressure chamber.

8. In an airplane, the combination with a continuous wing body, having lateral sections and a common trailing edge therewith, an engine-housing nose, said nose being narrowed to a transverse slot in front, and increased in depth and height rearwardly to diffuse the entering air, an upraised under forward surface forming an exterior pressure chamber back of said nose and open to the water, land and air surface beneath and terminating at or near the trailing edge of the plane completely underneath the bottom surface thereof, with no interventing floor or bottom at this rear portion of the said pressure chamber or upraised surface, and no obstruction between said upraised rear portion and the water, land or air thereunder, whereby air pressure from said pressure chamber is directly upon and against said elements thereunder, of a power system adapted to compress and force compressed air from the nose into said exterior pressure chamber.

9. An airplane comprising a continuous wing having a central section with plural engines below its upper leading edge, and a lower lip beneath the said edge forming an engine-housing nose, with a transverse slot therein, centrally thereof, the under surface of the central section being upraised back of the engines to form a pressure chamber, with which said nose communicates, swept-back stabilizing lateral sections, the under surface of said several sections being in one common plane from the trailing edge of the plane forwardly to the rear edge of the said pressure chamber formed by the upraised forward portion of the under surface of the central section.

10. An airplane with plural engines housed in its nose, an upraised under surface back of said nose forming an exterior pressure chamber, an air-foil mounted in said exterior chamber, and means for forcing compressed air from the nose rearwardly into the pressure chamber upon and against the under surface of the plane, and upon and against the said air-foil the said air-foil being formed and positioned to leave two passages, one above and one below the same, for the reception of air discharged from said nose, and dividing said discharge into both said passages, said passages both discharging rearwardly under the upraised under surface of the plane-body and not communicating with its interior, and discharging all the contents of said pressure chamber both front and rear into, upon and against the air, water or land surface beneath the plane, and the under portion of the nose being projected rearwardly under said air-foil to form therewith the lower passage and direct said air from the pressure chamber rearwardly under said air-foil and under the rear of the plane.

11. An airplane comprising central and lateral sections with plural engines housed in the nose thereof, a deeply indented upraised under surface back of said nose forming an exterior air-pressure chamber extending transversely substantially across the width of the several sections, an air-foil transversely in said pressure chamber, and means for forcing air into said exterior pressure chamber and upon and against the under surface of the plane-body, and upon and against the surface of the air-foil.

12. An airplane comprising a continuous wing having a raised central section, and lateral sections depressed relatively thereto, plural engines mounted in the nose of the plane, with compressor fans delivering compressed air therefrom, the under surface of the plane-body being upraised back of the nose to form an exterior pressure chamber, with which the nose of the plane communicates, whereby the compressed air is driven into the exterior pressure chamber against the under surface of the plane within said pressure chamber, an air-foil mounted in said exterior chamber whereby the said compressed air is driven against the surface of said air-foil, passages in said chamber between the air-foil and the said upraised under surface, ducts leading from the exterior pressure chamber rearwardly under the plane body and exteriorly thereof; the centre of pressure of the lateral sections being rearward of the centre of pressure of the central section and rearward of the centre of gravity of the plane, and the angle of incidence of said lateral sections being less than that of the central section.

13. An airplane formed of a continuous wing, with an upraised under surface back of its nose, to form an exterior pressure chamber, an air-foil mounted in said chamber, and a second air-foil mounted beneath the first air-foil in said chamber, at the base thereof, said chamber opening at bottom into the air beneath, and a compressor system forcing compressed air into said chamber.

14. An airplane formed of a continuous wing, with an upraised under forward surface forming an exterior pressure chamber, the nose of the plane being formed into an ejector nozzle opening into the said pressure chamber, a compressor system located in said nose, and directing compressed air into the pressure chamber, means within said chamber for diffusing said air initially and for directing it under the outside of the plane body, means within said chamber for entraining air from under the nose, means for recirculating air in said chamber back to the front of said pressure chamber, to recirculate it again with the air coming from the nozzle of the nose of the plane into the pressure chamber.

15. An airplane comprising a central section and lateral sections continuous therewith, plural engines mounted in the nose of the plane beneath the upper leading edge thereof, the under surface of the plane body being deeply indented and formed with an upraised exterior pressure chamber back of the nose, an air-foil mounted in said pressure chamber, and a second air-foil mounted beneath the first air-foil in said exterior pressure chamber, the rear end of the nose of the plane being formed into an ejector nozzle leading to the interior of the exterior pressure chamber, and passages formed by said chamber, said air-foil in said chamber, and the second air-foil beneath the same, whereby compressed air is directed between the two air-foils, into said chamber, and whereby air is entrained into the same passage from between the lower air-foil and the lower surface of the nose, and whereby air is further entrained into the rear end of the passage between the upper air-foil and the under surface of the plane-body, and re-entrained and recirculated again into the main passage between the upper and lower air-foils.

DOUGLAS K. WARNER.